United States Patent
Minemi et al.

(10) Patent No.: US 6,629,516 B1
(45) Date of Patent: Oct. 7, 2003

(54) EXHAUST PORT STRUCTURE OF INTERNAL COMBUSTION ENGINE

(75) Inventors: Masahiko Minemi, Wako (JP); Tsuneo Endoh, Wako (JP); Tatsuya Nakagawa, Wako (JP); Taizou Kitamura, Wako (JP); Atsushi Baba, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/111,395

(22) PCT Filed: Nov. 2, 2000

(86) PCT No.: PCT/JP00/07740
§ 371 (c)(1),
(2), (4) Date: Sep. 17, 2002

(87) PCT Pub. No.: WO01/33066
PCT Pub. Date: May 10, 2001

(30) Foreign Application Priority Data

Nov. 4, 1999 (JP) ............................................. 11-313484

(51) Int. Cl.[7] ................................................. F02F 1/42
(52) U.S. Cl. ........................................................ 123/193.5
(58) Field of Search ........................... 123/193.5, 190.12, 123/188.5

(56) References Cited

U.S. PATENT DOCUMENTS

| | | | | |
|---|---|---|---|---|
| 4,069,667 A | * | 1/1978 | Date et al. ................ | 123/193.5 |
| 4,089,163 A | * | 5/1978 | Yamazaki et al. ......... | 123/193.5 |
| 4,103,487 A | * | 8/1978 | Yamazaki et al. ......... | 123/193.5 |
| 4,195,477 A | * | 4/1980 | Yamazaki et al. ......... | 123/193.5 |
| 4,430,856 A | * | 2/1984 | Niedert ..................... | 123/193.5 |

FOREIGN PATENT DOCUMENTS

| | | |
|---|---|---|
| JP | 52-73210 | 6/1977 |
| JP | 63-45046 | 3/1988 |
| JP | 5-256191 | 10/1993 |

* cited by examiner

*Primary Examiner*—Marguerite McMahon
(74) *Attorney, Agent, or Firm*—Arent Fox Kintner Plotkin & Kahn, PLLC

(57) ABSTRACT

In an exhaust port structure in an internal combustion engine, a cylinder head has a cylinder head body and a cylindrical exhaust port liner. The exhaust port liner is partially supported at a plurality of points on the cylinder head body, and a heat-insulating layer exists around the exhaust port liner. Thus, it is possible to inhibit the propagation of heat from the exhaust port liner to the cylinder head body as much as possible.

15 Claims, 4 Drawing Sheets

EXHAUST PORT STRUCTURE OF INTERNAL COMBUSTION ENGINE

FIELD OF THE INVENTION

The present invention relates to an exhaust port structure in an internal combustion engine.

BACKGROUND ART

There is such a conventionally known exhaust port structure in which a cylindrical exhaust port liner is formed of a ceramic material and formed by casting in a cylinder head body (see Japanese Patent Application Laid-open No. 5-256191, for example).

There is a conventionally known waste heat recovering device for an internal combustion engine utilizing a Rankin cycle, which includes an evaporator for generating vapor having a raised temperature and a raised pressure, namely, raised-temperature/pressure vapor using an exhaust gas from the internal combustion engine as a heat source, an expander for expanding the raised-temperature/pressure vapor to generate an output, a condenser for liquefying vapor having a dropped temperature and a dropped pressure, namely, dropped-temperature/pressure vapor discharged from the expander after the expansion, and a supply pump for supplying a liquid, e.g., water from the condenser to the evaporator. In this case, the waste heat recovery efficiency can be increased by introducing the exhaust gas to the evaporator, while being maintained at a high temperature as much as possible, but the following problem is encountered in the conventional exhaust port structure: substantially the entire outer peripheral surface of the exhaust port liner is in contact with the cylinder head body and for this reason, the heat of the exhaust gas is propagated via the exhaust port liner to the cylinder head body and as a result, the temperature of the exhaust gas is dropped.

DISCLOSURE OF THE INVENTION

It is an object of the present invention to provide an exhaust port structure of the above-described type for an internal combustion engine, wherein the propagation of the heat from the exhaust port liner to the cylinder head body can be inhibited as much as possible.

To achieve the above object, according to the present invention, there is provided an exhaust port structure for an internal combustion engine, wherein a cylinder head has a cylinder head body and a cylindrical exhaust port liner, the cylindrical exhaust port liner being partially supported at a plurality of points on the cylinder head body, and a heat-insulating layer exists around the exhaust port liner.

With the above arrangement, a heat propagation path between the exhaust port liner and the cylinder head body can be reduced remarkably, whereby the propagation of heat from the exhaust port liner to the cylinder head body can be inhibited as much as possible to maintain the exhaust gas at a high temperature.

Sites existing respectively adjacent an inlet and an outlet for the exhaust gas and/or a valve stem-insertion section are selected as a plurality of partially supporting points on the exhaust port liner. By selecting such supporting points, an accuracy of attachment of the exhaust port liner to the cylinder head body can be ensured. In this case, a means for cooling the valve stem-insertion section is provided in the cylinder head body in order to maintain the positional accuracy of the valve stem-insertion section and inhibit the thermal expansion of the valve stem-insertion section to smoothly conduct the opening and closing movements of an exhaust valve.

BEST MODE FOR CARRYING OUT THE INVENTION

Figure 1:
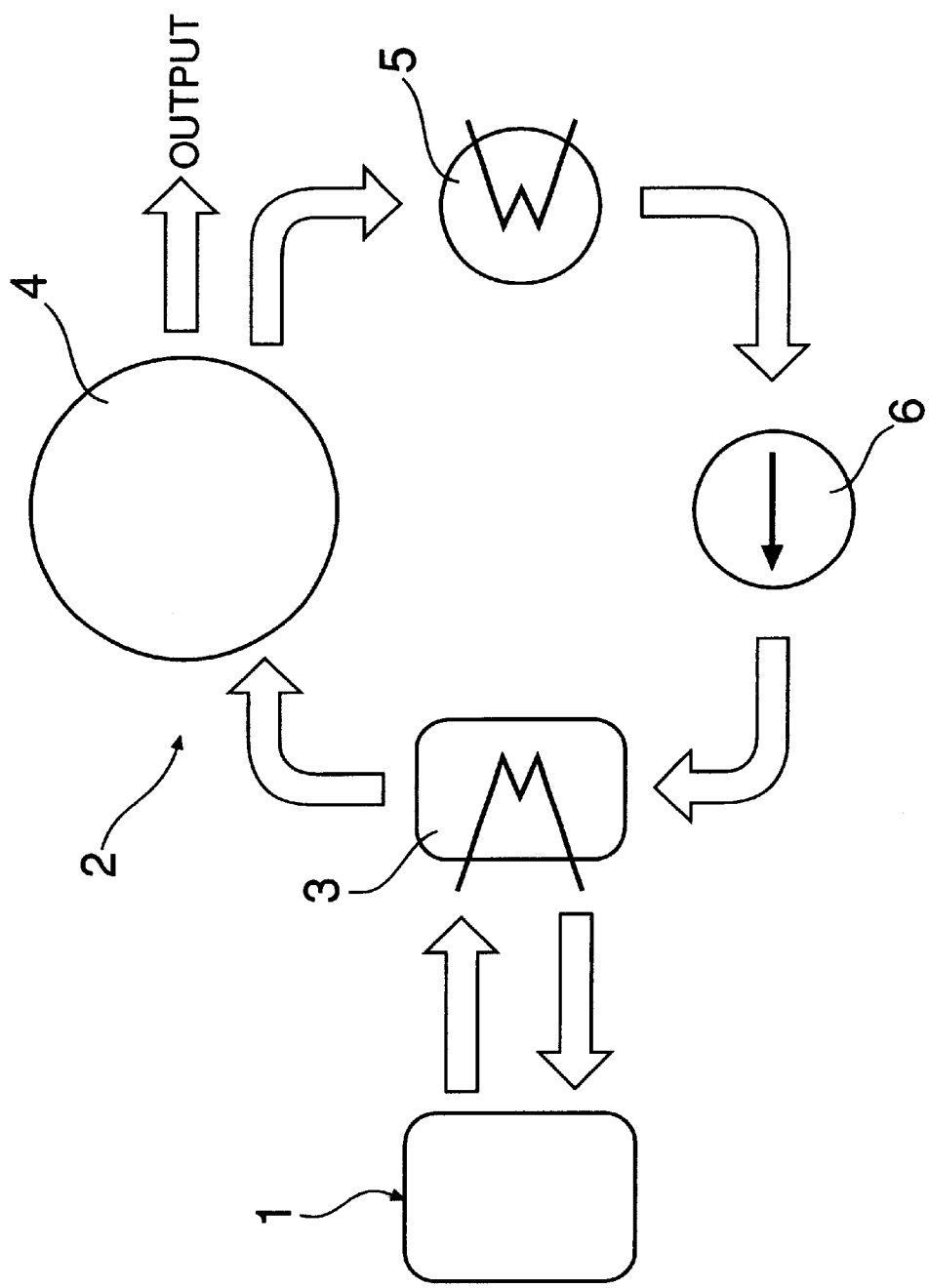
FIG. 1 is a schematic illustration of a waste heat recovering device for an internal combustion engine.

Referring to FIG. 1, a waste heat recovering device 2 for an internal combustion engine 1 utilizing a Rankin cycle includes an evaporator 3 for generating a vapor having a raised temperature and a raised pressure, namely, a raised-temperature/pressure vapor, utilizing an exhaust gas from the internal combustion engine as a heat source, an expander 4 for expanding the raised-temperature/pressure vapor to generate an output, a condenser 5 for liquefying a vapor having a dropped temperature and a dropped pressure, namely, dropped-temperature/pressure vapor discharged from the expander 4 after the expansion, and a supply pump 6 for supplying a liquid, e.g., water from the condenser 5 to the evaporator 3.

Figure 2:
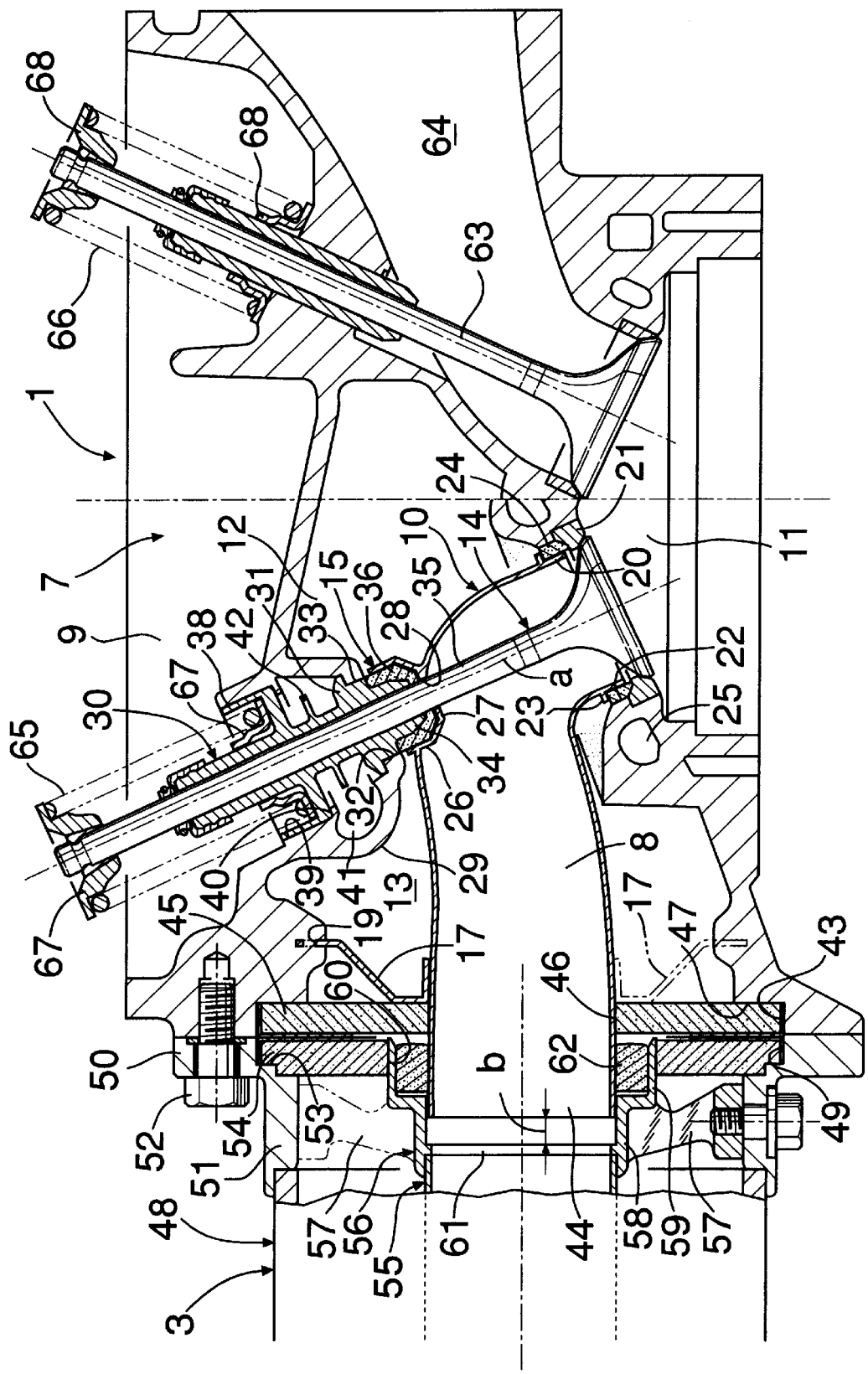
FIG. 2 is a vertical sectional front view showing one example of a cylinder head.

As shown in FIG. 2, the evaporator 3 is connected to an exhaust port 8 in a cylinder head 7 in the internal combustion engine 1, and the cylinder head 7 has an exhaust port structure as described below in order to introduce a high-temperature exhaust gas into the evaporator 3.

The cylinder head 7 includes a cylinder head body 9 made of an aluminum alloy, and a cylindrical exhaust port liner 10 made of a stainless steel. The cylinder head body 9 has a relatively large cavity 12 extending from above a combustion chamber 11 toward the evaporator 3, and the exhaust port liner 10 is partially supported at a plurality of points on the cylinder head body 9 within the cavity 12. A heat-insulating layer 13 is provided around the exhaust port liner 10 by air existing in the cavity 12.

Figure 3:
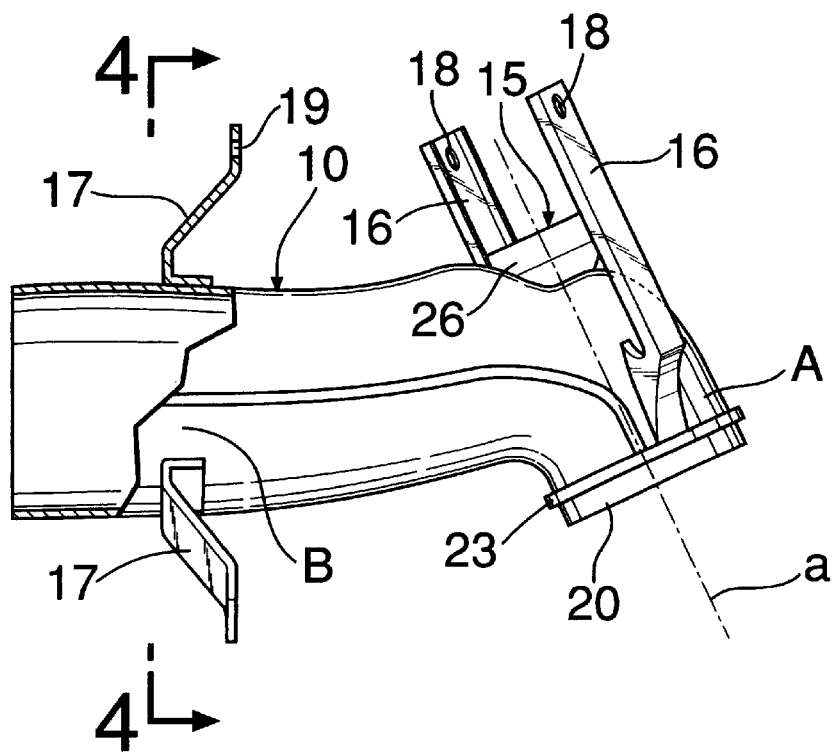
FIG. 3 is a partially cutaway front view of an exhaust port liner.
Figure 4:
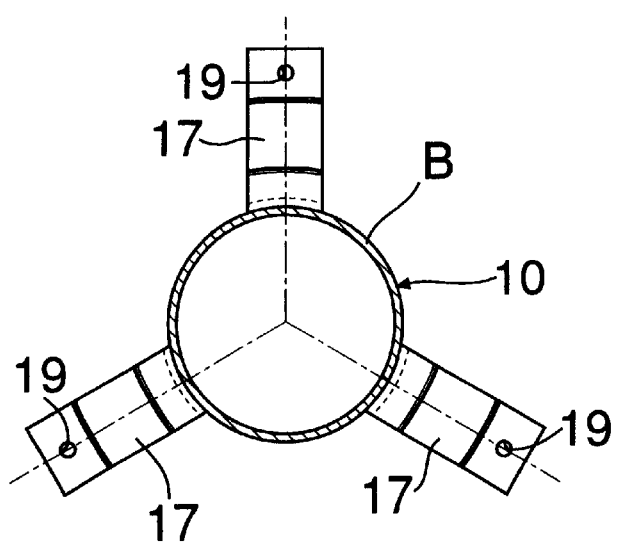
FIG. 4 is a sectional end face view taken along a line 4—4 in FIG. 3.

Selected as a plurality of partially supporting points on the exhaust port liner 10 are a site A existing at a portion of an outer peripheral surface adjacent an exhaust gas inlet where an exhaust valve 14 is disposed, a site B existing at a portion of the outer peripheral surface adjacent an exhaust gas outlet, and a valve stem-insertion section 15, as shown in FIGS. 2 to 4. Specifically, two stays 16 made of a stainless steel are disposed in an opposed relation to each other at the site A existing at a portion of the outer peripheral surface adjacent the exhaust gas inlet, so that they sandwiches the valve stem-insertion section 15 and are substantially parallel to an axis a of a valve stem. Each of the stays 16 is welded at one end thereof to the site A. Three stays 17 made of a stainless steel are disposed at distances of 120 degree in a circumferential direction at the site B existing at the portion of the outer peripheral surface adjacent the exhaust gas outlet and are each welded at one end thereof to the site B.

Figure 5:
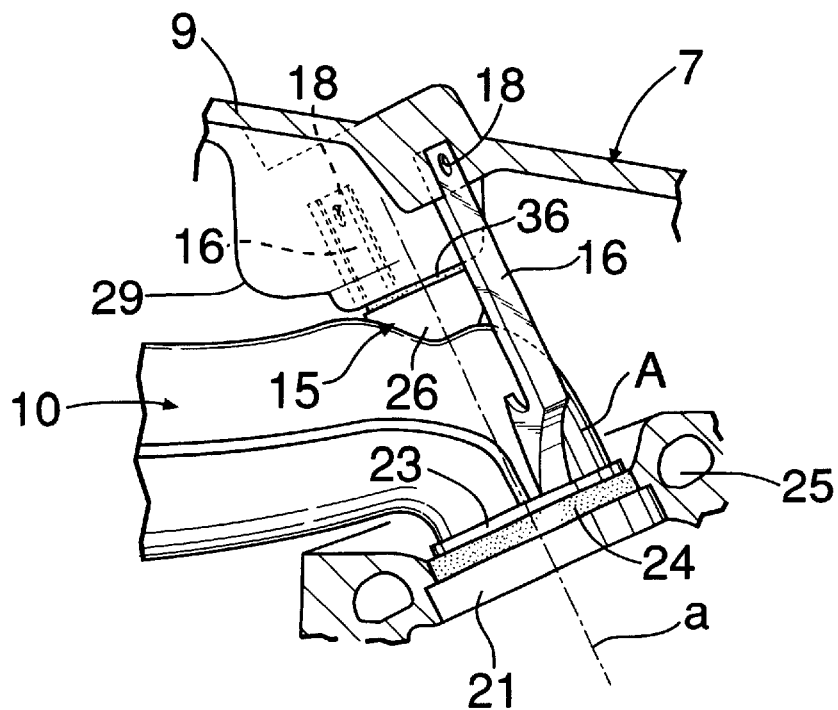
FIG. 5 is a partially cutaway front view of essential portions in a structure of supporting of the exhaust port liner.

The other ends of the stays 16 and 17 have been formed by casting in the cylinder head body 9 in the course of forming the cylinder head body 9 in a casting process, as shown in FIGS. 2 and 5. Through-bores 18 and 19 are defined in the other ends of the stays 16 and 17 in order to enhance the effect of anchoring the stays 16 and 17.

The two stays 16 existing at the portion of the outer peripheral surface adjacent the exhaust gas inlet are formed into a U-shape in section to have a rigidity. Thus the expansion and shrinkage of the portion of the exhaust port liner 10 adjacent the exhaust gas inlet due to a heat is inhibited as much as possible to maintain the smooth opening and closing movements of the exhaust valve 14. On the other hand, the three stays 17 existing at the portion of the outer peripheral surface adjacent the exhaust gas outlet are formed from a thin stainless steel having a thickness of 0.5 mm, for example, so that they are resiliently deformable. The stays 17 have a function of permitting the expansion and shrinkage of the portion of the exhaust port liner 10 adjacent the exhaust gas outlet due to a heat.

As best shown in FIG. 2, an inlet-defining portion 20 of the exhaust port liner 10 is loosely inserted into a bore 22 adjacent a valve seat 21, and an annular space between the valve seat 21 and a flange 23 of the exhaust port liner 10 existing in the vicinity of the inlet-defining portion 20 is filled with a heat-insulating annular seal member 24 having a cushioning property. Thus, the leakage of the gas along between an outer peripheral surface of the inlet-defining portion 20 and an inner peripheral surface of the bore 22 is prevented, and the expansion and shrinkage of the inlet-defining portion 20 and a portion in the vicinity of the inlet-defining portion 20 due to the heat are permitted. An annular cooling water passage 25 is provided in the cylinder head body 9 to cool the valve seat 21. The seal member 24 is a formed product comprising an alumina fiber, a silica fiber and a binder and has a durable temperature of 1100° C. or more and a heat transfer coefficient of 0.2 W/(m.K).

The valve stem-insertion section 15 includes a cylindrical portion 26 and a bottom wall portion 27 located adjacent the valve seat 21, and a valve stem-insertion bore 28 is defined in the bottom wall portion 27. The cylinder head body 9 has a holder tube 29 provided with its opposite ends opened so as to be opposed to an opening of the cylindrical portion 26, and a hollow valve stem guide 30 is retained on the holder tube 29 in the following manner: A slip-off preventing flange 31 provided on the valve stem guide 30 at a location adjacent the exhaust port liner 10 is engaged with an inner edge of one of openings 32 in the holder tube 30, and a cylindrical portion 33 located outside the slip-off preventing flange 31 is water-tightly fitted in the opening 32. Further, a protrusion 34 located outside the cylindrical portion 33 is loosely inserted into the cylindrical portion 26 of the valve stem-insertion section 15. A valve stem 35 of the exhaust valve 14 extends through the insertion bore 28 in the bottom wall portion 27 and the valve stem guide 30. A cylindrical space defined by the cylindrical portion 26, the bottom wall portion 27, the protrusion 34 and the stem 35 is filled with a heat-insulating cylindrical seal member 36 having a cushioning property similar to that described above. A portion of the cylindrical seal member 36 protrudes from the cylindrical portion 26 to abut against an end face of the cylindrical portion 33 of the valve stem guide 30. Thus, the valve stem-insertion section 15 of the exhaust port liner 10 is supported on the valve head body 9 with the cylindrical seal member 36 and the valve stem guide 30 interposed therebetween. In addition, the leakage of the gas along between the outer peripheral surface of the valve stem 35 and the inner peripheral surface of the cylindrical portion 26 is prevented by the cylindrical seal member 36. The valve stem guide 30 has a spring retainer-retaining bottomed cylindrical portion 38 of a cup shape provided at its intermediate portion, so that an outer peripheral surface of the bottomed cylindrical portion 38 is water-tightly fitted into the other opening 39 in the holder tube 29, with an outer peripheral edge of its bottom wall being engaged with a step 40 on the inner peripheral surface of the holder tube 29. Thus, a cooling water chamber 41 as a means for cooling the valve stem-insertion section 15 is defined within the holder tube 29 by the slip-off preventing flange 31 and the bottomed cylindrical portion 38. A heat-radiating flange 42 is provided at a portion of the valve stem guide 30, which is located within the cooling water chamber 41.

The cavity 12 in the cylinder head body 9 opens into an end face of the cylinder head body 9 on the side of the evaporator 3, and an outlet-defining portion 44 of the exhaust port liner 10 protrudes from an opening 43 of the cavity 12. To close the opening 43, the exhaust port liner 10 is fitted into a bore 46 in an annular heat-insulating plate 45, and an outer periphery of the annular heat-insulating plate 45 is fitted into an annular recess 47 in the opening 43.

A housing 48 of the evaporator 3 is provided at its end with a connecting tube 51 having a flange 50 and an opening 49 surrounding the outlet-defining portion 44, so that the evaporator 3 is mounted to the cylinder head 7 by fastening the flange 50 to the cylinder head body 9 by a plurality of bolts 52. An annular heat-insulating plate 54 is fitted into an annular recess 53 in the opening 49 and pushed by the annular heat-insulating plate 45 of the cylinder head 7. An exhaust gas-introducing pipe 55 of the evaporator 3 has a connecting tube 56 at its end. The connecting tube 56 is supported on a connecting tube 51 for the housing 48 through a plurality of stays 57 provided on an outer peripheral surface of the connecting tube 56. The connecting tube 56 has a smaller-diameter portion 58 fitted over an outer peripheral surface of an outer end of the outlet-defining portion 44 of the exhaust port liner 44, and a larger-diameter portion 59 leading to an outer end of the smaller-diameter portion 58 and fitted into a bore 60 in the annular heat-insulating plate 54. A clearance b is provided between an end face of the outlet-defining portion 44 and an annular projection 61 on an inner peripheral surface of the smaller-diameter portion 58 to permit the expansion and shrinkage of a portion of the exhaust port liner 10 adjacent the exhaust gas outlet due to the heat. An annular space between an inner peripheral surface of the larger-diameter portion 59 and the outer peripheral surface of the outlet-defining portion 44 is filled with a heat-insulating annular seal member 62 having a cushioning property similar to that described above. Thus, the leakage of the gas along between the outer peripheral surface of the outlet-defining portion 44 and the inner peripheral surface of the larger-diameter portion 59 is prevented.

In FIG. 2, 63 denotes an intake valve; 64 an intake port; 65 and 66 valve springs; and 67 and 68 spring retainers.

With the above-described arrangement, the heat-propagation path between the exhaust port liner 10 and the cylinder head body 9 can be reduced remarkably, whereby the exhaust gas can be maintained at a high temperature and introduced into the evaporator 3.

The sites A and B existing adjacent the exhaust gas inlet and outlet and the valve stem-insertion section 15 are selected as the partially supporting points on the exhaust port liner 10 and hence, it is possible to ensure an accuracy of attachment of the exhaust port liner 10 to the cylinder head body 9.

Further, the cooling water chamber 4 is provided in the cylinder head body 9, whereby the valve stem-insertion section 15 of the exhaust port liner 10 can be cooled through the valve stem guide 30. Therefore, it is possible to maintain a positional accuracy of the valve stem-insertion section 15 and to inhibit the thermal expansion of the valve stem-insertion section 15 to smoothly conduct the opening and closing movements of the exhaust valve 14.

Figure 6:
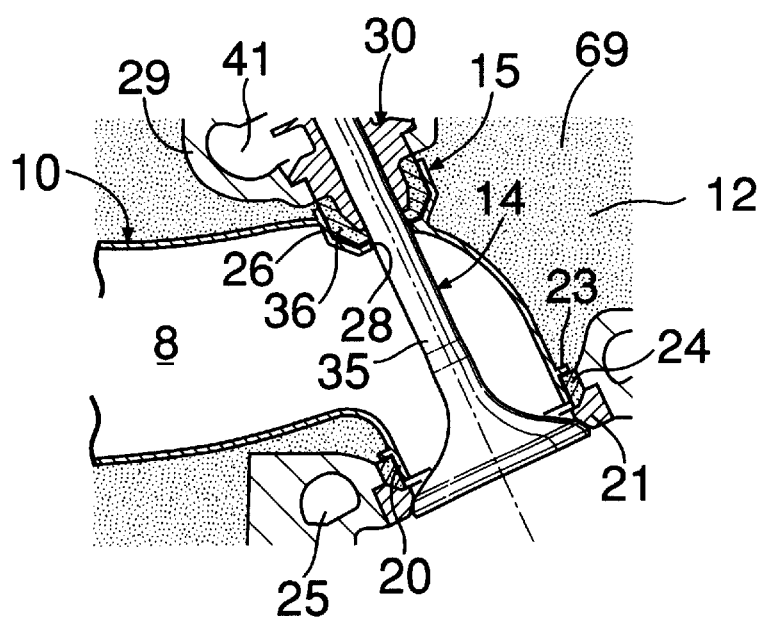
FIG. 6 is a partially vertical sectional front view similar to FIG. 2, but showing another example of a cylinder head.

To further inhibit the transfer of the heat from the exhaust port liner 10 to the cylinder head body 9, a heat-insulating layer 69 formed by filling a heat-insulating powder material comprising nm-sized particles into the cavity 12 is used, as shown in FIG. 6. The term "filling" used herein means a filling of such an extent that a weak consolidating force is provided by applying a pressing force of about 0.06 MPa to the heat-insulating powder material placed in to the cavity 12. The heat-insulating powder material used is a powder mixture comprising 66% by weight of an $SiO_2$ powder having an average particle size of 7 nm (made under a trade name of Fumed silica by Nippon Aerogel, Co.) and 34% by weight of a $TiO_2$ powder having an average particle size of 15 nm (made under a trade name of MT-150W by Teika, Co.).

If such heat-insulating layer 69 is used, because the forming particles are extremely fine, the following heat-insulating functions are provided: (a) a thermal resistance in an area of contact of the adjacent particles is large; (b) a heat movement path through a large number of particles is complicated; and (c) a gap between the adjacent particles is very small and hence, a convection of air is hard to occur, and in addition, a heat-insulating function, such that $TiO_2$ exhibits an effect of scattering the radiant heat, is provided. Therefore, the heat-insulating layer 69 exhibits an excellent heat-insulating effect at a high temperature. The heat transfer coefficient of the heat-insulating layer 13 formed by air is increased steeply at a temperature equal to or higher than 750° C. and is equal to or higher than 1 W/(m.K) at a temperature equal to or higher than 1000° C., but the heat transfer coefficient of the heat-insulating layer 69 formed of the heat-insulating powder material is maintained at about 0.1 W/(m.K) at a temperature equal to or higher than 1000° C.

To enhance the oxidation resistance and corrosion resistance of the exhaust port liner 10, a protective layer may be formed on the inner peripheral surface of the exhaust port liner 10. In this case, a coating layer formed of at least one group selected from an NiAl-based intermetallic compound, an FeAl-based intermetallic compound, a CrAl-based intermetallic compound or the like, for example, is used as the protective layer.

Only the sites A and B existing adjacent the inlet and outlet for the exhaust gas may be selected as the supporting points on the exhaust port liner 10, and the valve stem-insertion section 15 may be out of the selection.

What is claimed is:

1. An exhaust port structure for an internal combustion engine, wherein a cylinder head has a cylinder head body and a cylindrical exhaust port liner, said exhaust port liner being partially supported at a plurality of points on said cylinder head body, and a heat-insulating layer is provided around said exhaust port liner, wherein said partially supporting points include a valve stem-insertion section having a valve stem-inserting bore defined therein through which a valve stem of an exhaust valve extends, wherein said valve stem also extends through a valve stem guide and a cylindrical seal member is interposed between said valve stem-insertion section and said valve stem guide.

2. An exhaust port structure for an internal combustion engine according to claim 1, wherein said plurality of partially supporting points on said exhaust port liner further includes a site existing adjacent an exhaust gas inlet and a site existing adjacent an exhaust gas outlet.

3. An exhaust port structure for an internal combustion engine according to claim 1, wherein said cylinder head further comprises means for cooling said valve stem-insertion section.

4. An exhaust port structure for an internal combustion engine according to claim 1, wherein said valve stem-insertion section further includes a cylindrical portion and a bottom wall portion within which said valve stem-inserting bore is defined, wherein an end of said valve stem guide includes a protrusion, and wherein said cylindrical seal member is provided in a cylindrical space defined by said cylindrical portion of said valve stem-insertion section, said bottom wall section of said valve stem-insertion section, said protrusion of said valve stem guide, and said valve stem.

5. An exhaust port structure for an internal combustion engine according to claim 4, wherein a portion of said cylindrical seal member protrudes from said cylindrical portion of said valve stem-insertion section and abuts against an end face of said protrusion of said valve stem guide.

6. An exhaust port structure for an internal combustion engine according to claim 4, wherein said protrusion of said valve stem guide is inserted into said cylindrical portion of said valve stem-insertion section.

7. An exhaust port structure for an internal combustion engine according to claim 4, wherein said valve stem guide further includes a slip-off preventing flange disposed adjacent said cylindrical exhaust port liner and a cylindrical portion of said valve stem guide is disposed intermediate said slip-off preventing flange and said protrusion.

8. An exhaust port structure for an internal combustion engine according to claim 7, wherein said cylinder head body further includes a holder tube having a first opening opposite an opening of said cylindrical portion of said valve stem-insertion section, said slip-off preventing flange of said valve stem guide being water-tightly fitted in said first opening of said holder tube, wherein said valve stem guide is retained on said holder tube.

9. An exhaust port structure for an internal combustion engine according to claim 8, wherein said holder tube includes a second opening within which an outer peripheral surface of a spring retainer-retaining bottomed cylindrical portion of said valve stem guide is water-tightly fitted.

10. An exhaust port structure for an internal combustion engine according to claim 9, wherein said spring retainer-retaining bottomed cylindrical portion of said valve stem guide is cup shaped.

11. An exhaust port structure for an internal combustion engine according to claim 9, wherein an inner peripheral surface of said holder tube has a step which engages an outer peripheral edge of a bottom wall of said spring retainer-retaining bottomed cylindrical portion of said valve stem guide.

12. An exhaust port structure for an internal combustion engine according to claim 9, further including a cooling means for cooling said valve stem-insertion section, wherein said cooling means is defined by said holder tube, said slip-off preventing flange of said valve stem guide, and said spring retainer-retaining bottomed cylindrical portion of said valve stem guide.

13. An exhaust port structure for an internal combustion engine according to claim 12, wherein said cooling means is a cooling water chamber.

14. An exhaust port structure for an internal combustion engine according to claim 12, wherein said valve stem guide includes a heat-radiating flange radially extending away therefrom and into said cooling means.

15. An exhaust port structure for an internal combustion engine according to claim 12, wherein said valve stem-insertion section is cooled through said valve stem guide.

* * * * *